(12) United States Patent
Schmidt

(10) Patent No.: US 7,011,282 B2
(45) Date of Patent: Mar. 14, 2006

(54) BELL MOUNT FOR MOUNTING EXTERIOR MIRROR TO A VEHICLE

(75) Inventor: William Schmidt, Newport, MI (US)

(73) Assignee: Mirror Lite, Rockwood, MI (US)

( * ) Notice: Subject to any disclaimer, the term of this patent is extended or adjusted under 35 U.S.C. 154(b) by 0 days.

(21) Appl. No.: 10/358,614

(22) Filed: Feb. 5, 2003

(65) Prior Publication Data

US 2003/0146363 A1 Aug. 7, 2003

Related U.S. Application Data

(60) Provisional application No. 60/354,775, filed on Feb. 5, 2002.

(51) Int. Cl.
*A47F 1/14* (2006.01)

(52) U.S. Cl. .................................. 248/466; 248/475.1

(58) Field of Classification Search .................. 248/466, 248/475.1, 479.1, 487; 359/871
See application file for complete search history.

(56) References Cited

U.S. PATENT DOCUMENTS

| 4,253,633 A | * | 3/1981 | Takegawa ................. 248/475.1 |
| 5,198,938 A | * | 3/1993 | Ward ........................... 359/864 |
| 6,516,664 B1 | * | 2/2003 | Lynam ..................... 73/170.17 |

* cited by examiner

*Primary Examiner*—Ramon O Ramirez
(74) *Attorney, Agent, or Firm*—John A. Artz; Artz & Artz

(57) ABSTRACT

A mounting device for mounting exterior devices, such as mirrors, to vehicles and the like. The mirror is attached to a bracket which in turn is connected to the mounting device. The mounting device includes a convex mounting disk, a planar deformable backing disk and two gasket members, all of which are connected to the vehicle with a fastener.

19 Claims, 2 Drawing Sheets

BELL MOUNT FOR MOUNTING EXTERIOR MIRROR TO A VEHICLE

CROSS REFERENCE TO RELATED APPLICATIONS

This application claims priority from provisional application Serial No. 60/354,775, filed on Feb. 5, 2002.

TECHNICAL FIELD

The present invention pertains to mounting devices. More particularly, the present invention pertains to mounting devices for mounting mirror assemblies thereto. Even more particularly, the present invention concerns vehicular-related mounting devices for mounting exterior mirrors or mirror assemblies thereonto.

BACKGROUND OF THE INVENTION

As is known to those skilled in the art to which the present invention pertains, the mounting of exterior accessories, such as mirrors and the like, to vehicular bodies creates certain long-term problems. This is especially true where the body is made of a thin sheet metal or plastic, such as fiberglass or the like. Over extended periods of time there is a tendency for a mirror assembly to "creep" or to become dislodged and move from its original mounting position. This is because, typically, such mirror assemblies are mounted via a mounting bracket which uses threaded fasteners which extend through the sheet metal or through pre-formed holes or apertures formed in the vehicular body. Because of vibration, bouncing, rutting and the like, the hole or aperture tends to expand or deform thus causing the "creep". The art has sought to alleviate this problem through the use of improved fasteners such as well nuts and the like. However, this has not proved sufficient.

SUMMARY OF THE INVENTION

It is an object of the present invention to provide mounting mechanisms for mounting exterior devices such as mirrors which alleviate the problem of creeping or creep. The present invention as shown in the drawings and described and claimed herein overcomes the problems in the field and provides mounting devices, systems and methods which are improvements over known mirror mounting devices, systems and methods.

In accordance with the present invention, a bell mount device is provided which has a convex mounting disk and a gasket member positioned on one side of a vehicle body panel member and a backing disk and second gasket member positioned on the opposite side of the panel member. A mounting arm (such as an L-shaped bracket) is positioned on the mounting disk and all of the components are fastened together on the panel member with a bolt or other fastener. A mirror is mounted on the mounting arm.

The backing disk is deformable and preferably has a plurality of cutout portions to facilitate the deformation. Each of the components has openings which when aligned are used to position the bolt or other fastener. The openings in the mounting disk and backing disk have tubular channel configurations which act to limit movement of the bell mount and mirror relative to the vehicle and thereby prevent creep.

DESCRIPTION OF THE PREFERRED EMBODIMENT(S)

Figure 1:
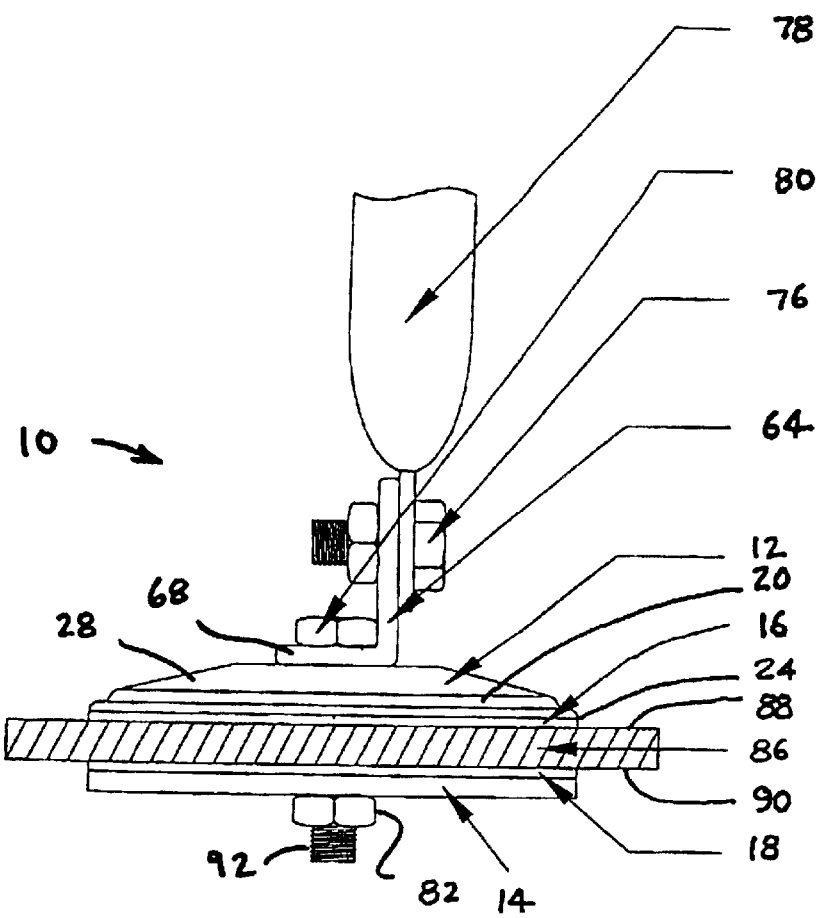
FIG. 1 is a side elevational view, partly in cross-section, of a mounting device in accordance with the present invention.
Figures 2, 3, 4:
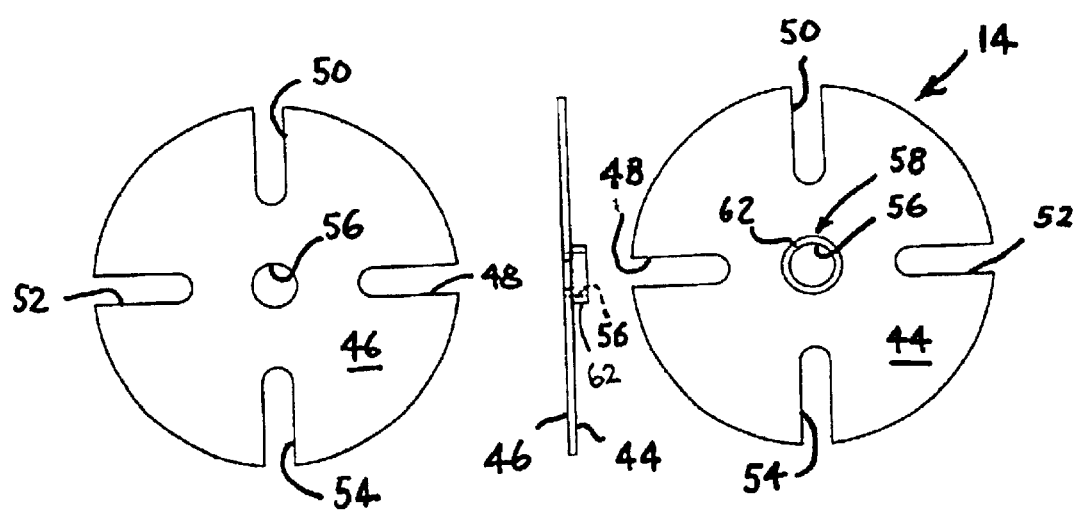
FIG. 2 is a front view of a backing disk used in the present invention.
FIG. 3 is a rear view of the backing disk.
FIG. 4 is a side view of the backing disk.

In accordance herewith and as shown in the drawings, there is provided herein a bell mount for use in mounting devices such as exterior mirror assemblies thereonto. Specifically, the present bell mount is devised for mounting an exterior mirror to a vehicular body such as a school bus or the like, where the mount is secured to the vehicular body. As is detailed herein below, the present mounting device enables sandwiching of a portion of the exterior vehicular body thereto in such manner as to prevent creep.

With more particularity, and as shown in the drawing, and in particular, FIG. 1, the present mounting device or bell mount, generally, denoted at 10 comprises a mounting disk 12 and a deformable backing disk 14. A pair of gaskets 16 and 18, respectively, are associated with the mounting member 12 as well as the disk 14, as is detailed hereinafter.

Figure 7:
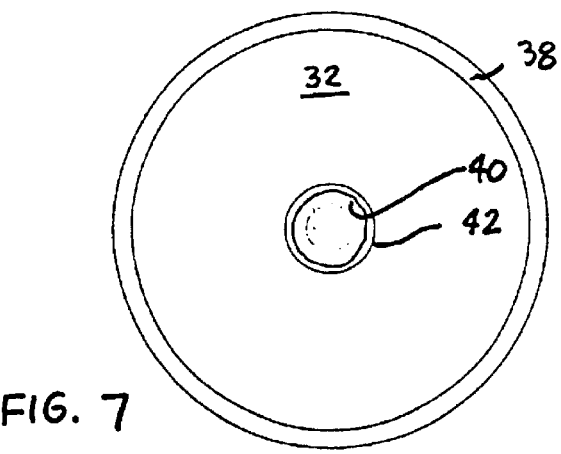
FIG. 7 is a bottom view of the mounting disk.
Figure 6:
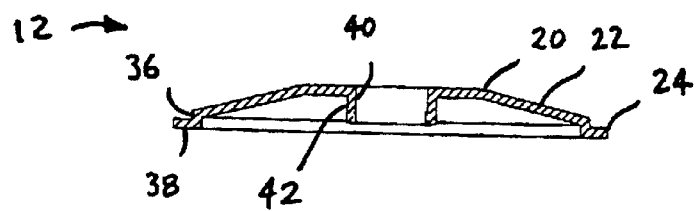
FIG. 6 is a cross-sectional view of a bell-shaped mounting disk used in the present invention.

The mounting disk 12, as shown in FIGS. 1, 6 and 7, generally, comprises a dome or convex central body 20, an intermediate side wall 22 integrally formed therewith and a peripheral mounting lip 24, which is integral with the sidewall 22. The mounting member has an upper or exterior side 28 and an obverse or opposite side 32. The lip 24 has a first leg 36 associated with the exterior surface and depends downwardly therefrom terminating at a peripheral edge 38. The edge 38 contacts the vehicular surface when deployed.

As shown in the drawings, the mounting disk 12 is provided with a centrally disposed aperture or mounting hole 40. Preferably, the mounting hole 40 is extruded and preferably the mounting disk is made from a metal material. By extruding the hole 40, there is provided a substantially cylindrical, or tubular channel having a sidewall 42. The sidewall 42 thus limits movement of a mounting fastener as described hereinbelow.

As noted hereinabove, and as shown in FIGS. 1–4, the second component of the mounting device comprises the backing disk 14. The disk 14 is preferably a substantially planar member having an upper surface 44 and a lower surface or rear surface 46. The disk 14 is formed from any suitable material which provides structural strength for securing a mirror or the like to the mounting member while being deformable or semi-flexible at the same time. Thus, preferably, the disk 14 is formed from a thin sheet steel, aluminum or the like. If weathering is a consideration, the disk 14 may be treated such as with a passivated surface or the like.

Although the disk is shown as being circular, it is to be understood that any other shape can be used so long as it is complementary to, and conforms to the shape of the peripheral edge 24 of the mounting disk or member 12.

Circumferentially disposed about the backing disk 14 are a plurality of cut-out sections or portions 48, 50, 52 and 54 respectively. These cut-out portions facilitate the flexibility or deformation of the disk while maintaining the structural integrity thereof. In essence, the cut-out sections provide stress relief points or areas to the disk.

As shown, the disk 14 is also provided with a central opening 56 which registers with the opening formed in the mounting member. As with the mounting member 12, the opening 52 is an extrusion 56 such that there is provided a substantially cylindrical channel member having a cylindrical sidewall 62. The openings are of equal diameter.

Figure 5:
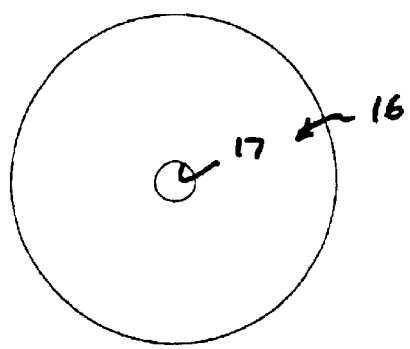
FIG. 5 is a plan view of a gasket used in the present device.

In use, and as shown in FIGS. 1 and 5, associated with each of the mounting and the disk are gaskets 16, 18 respectively, which are surface engaging gaskets to prevent scratching or cracking of the vehicular body when the mounting member is deployed. Each gasket 16 and 18 has a central opening 17 or 19 through which a fastener projects.

Figure 9:
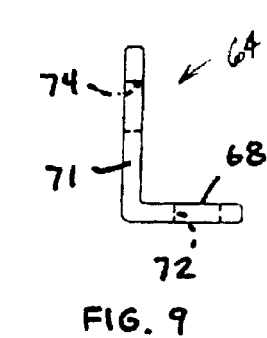
FIG. 9 is a side view of the L-shaped bracket.
Figure 8:
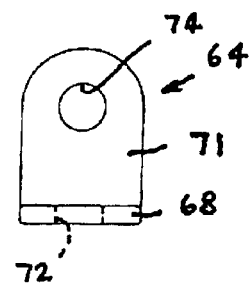
FIG. 8 is a front view of an L-shaped bracket used herein.

Referring now to FIGS. 1, 8 and 9, in order to mount an exterior accessory using the present mounting device, a substantially L-shaped mounting bracket 64 is removably mounted to the mounting disk 12. The bracket 64 is adapted to receive a mirror arm or mounting shaft or the like which is secured thereto.

In the drawing, the mounting bracket 64 is depicted as a substantially L-shaped member ("L" foot) having a first leg member 68 and a second leg member 71. The first leg member 68 has a central opening 72 which registers with the opening 40 formed in the mounting member 12. The second leg member 71 has a second opening 74 which receives a fastener 76 or the like associated with a mirror mounting shaft 78 or similar type of mounting member.

In securing the L-foot 64 to the bell mount 10, a fastener such as a stove bolt 80 or the like is inserted through the opening 72, the extruded channel 40 as well as the openings in the gaskets and the central opening 56 formed in the backing disk 14. A nut 82 is used to fix the fastener 80 in position. Because the fastener is retained in the extruded openings or channel members and is trapped by the sidewalls 42, 62 thereof, the fastener cannot creep when it is installed.

As shown in FIG. 1, in deploying the present device, a hole or opening (not shown) is first formed in the vehicle body 86. Then, the gasket 16 is brought into engagement with the exterior vehicle surface 88 with the gasket opening 17 in registry with the opening formed in the vehicle. Then, the mounting disk or member 12 is brought into overlying relationship with the gasket 16, as shown. Substantially simultaneously, the gasket 18 is brought into engagement with the interior surface 90 of the vehicle body such that its central opening is in registry with the opening 17 of the gasket 16 and the opening 40 of the mounting member 12. Then, the backing disk 14 is brought into overlying relationship with its associated gasket 18 with the central opening 56 thereof registering with the opening of the gasket. Because of the tubular or cylindrical nature of the opening 56, the threaded portion of the fastener is securely retained therewithin.

When the nut 82 is threadably mounted onto the threaded portion of the fastener 80, the disk 14 is drawn into the vehicular body 86 and deforms to conform to the surface 90 thereof without harming or marring the surface. By virtue of the extruded openings, and as noted above, creep is eliminated thereby providing an extended useful life of the mirror without the need for repair of the vehicle body.

It should be noted that although the present mount has been described with reference to a vehicle body for mounting exterior vehicular mirrors such as on school buses or the like, it is to be appreciated the present mounting device is not so limited. It can be used in those environments where a "sandwiching" of a surface between two opposed members is desired.

It is to be appreciated from the preceding that there has been described herein a mounting device which prevents or precludes or substantially eliminates the creep normally associated with the mounting brackets for exterior school bus mirror mounting brackets and which is efficacious in other environments.

While particular embodiments of the invention have been shown and described, numerous variations and alternate embodiments will occur to those skilled in the art. Accordingly, it is intended that the invention be limited only in terms of the appended claims.

What is claimed is:

1. A mounting device for mounting exterior devices to a vehicle panel member, said device comprising:
   a convex mounting disk;
   a first gasket member positioned adjacent said mounting disk;
   said convex mounting disk and first gasket member adapted to be positioned on one side of a vehicle panel member;
   a backing disk; and
   a second gasket member positioned adjacent said backing disk;
   said backing disk and second gasket member adapted to be positioned on the other side of a vehicle panel member.

2. The mounting device as recited in claim 1 wherein said mounting disk has a centrally located opening with a tubular channel therein.

3. The mounting device as recited in claim 1 wherein said mounting disk is extruded from a metal material.

4. The mounting device as described in claim 1 wherein said backing disk has a centrally located opening with a tubular channel therein.

5. The mounting device as described in claim 1 wherein said mounting disk, backing disk and first and second gasket members are secured together by a fastener member.

6. The mounting device as recited in claim 5 wherein each of said mounting disk, backing disk and first and second gasket members have centrally located openings therein which are aligned in order to be secured together by said fastener member which is positioned in said aligned openings.

7. The mounting device as recited in claim 6 wherein said mounting disk and backing disk have tubular channel members in said centrally located openings.

8. The mounting device as recited in claim 1 further comprising a mounting bracket for securing said mounting device to an exterior device.

9. The mounting device as set forth in claim 8 wherein said mounting bracket has a L-shaped configuration.

10. The mounting device as set forth in claim 1 wherein said backing disk is a planar member with at least one cut-out portion therein, wherein said backing disk is deformable.

11. The mounting device as recited in claim 10 wherein said backing disk has a plurality of cut out portions therein.

12. A system for securing a mounting device to a vehicle panel member, said panel member having a first opening therein, said system comprising a first gasket member and backing disk positioned on one side of said panel member and a convex mounting disk and second gasket member positioned on the other side of said panel member, each of said backing disk, mounting disk and first and second gasket members having centrally located aligned openings therein, and a fastener member positioned through said first opening in said panel member and through said aligned openings, said fastener member securely fixing said mounting device to said panel member.

13. The system as recited in claim 12 further comprising a mounting bracket, said mounting bracket positioned on and secured to said mounting device by said fastener member.

14. The system as recited in claim 13 wherein said mounting bracket has an L-shaped configuration and is adapted to secure an exterior mirror to said mounting device.

15. The system as recited in claim 12 wherein said mounting disk and said backing disk each have tubular channel members positioned at said centrally-located openings.

16. The system as recited in claim 12 wherein said backing disk has a plurality of cut-out portions therein and is deformable.

17. A method for securing a mirror assembly to a vehicle panel member, said panel member having a first opening therein, said method comprising the steps of:

positioning a first gasket member on one side of said panel member, said first gasket member having a centrally located opening aligned with said first opening;

positioning a mounting disk adjacent said first gasket member, said mounting disk having a convex configuration and a centrally located opening aligned with said first opening;

positioning a second gasket member on the other side of said panel member, said second gasket member having a centrally located opening aligned with said first opening;

positioning a backing disk adjacent said second gasket member, said backing disk having a planar configuration and a centrally located opening aligned with said first opening;

positioning a mounting bracket on said mounting disk, said mounting bracket having a second opening thereon aligned with said first opening;

positioning a fastener member through said first opening, said second opening, and said centrally located aligned openings in said first and second gasket members, said mounting disk and said backing disk; and securing a mirror assembly to said mounting bracket.

18. The method as set forth in claim 17 further comprising the step of providing tubular channel members on said centrally located openings in said mounting disk and said backing disk.

19. The method as set forth in claim 17 further comprising the step of providing a plurality of cut-out portions on said backing disk.

\* \* \* \* \*